May 19, 1931.  M. L. BRAMSON  1,806,385
VARIABLE PITCH PROPELLER
Filed March 25, 1926
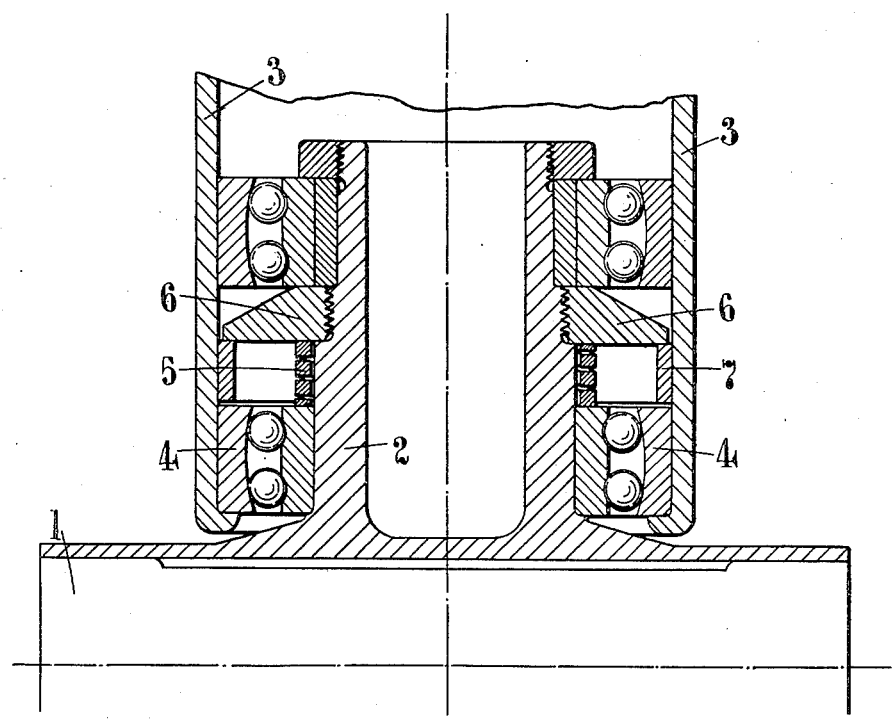
INVENTOR
M. L. BRAMSON
BY Langner, Parry, Card & Langner
ATTORNEYS Patented May 19, 1931

1,806,385

UNITED STATES PATENT OFFICE

MOGENS LOUIS BRAMSON, OF HENDON, LONDON, ENGLAND

VARIABLE PITCH PROPELLER

Application filed March 25, 1926, Serial No. 97,391, and in Great Britain March 30, 1925.

The invention relates to variable pitch propellers for use with aircraft of the type wherein the blades are so mounted upon the boss of the propeller as to be capable of angular movement around axes at right angles to the propeller shaft so that the pitch of the blades may be varied by the pilot during flight for the purpose of obtaining maximum efficiency of the propeller at varying air speeds and/or air densities.

According to this invention mechanical means are provided for taking the centrifugal load on the blades of the propeller in two different manners depending upon whether the speed of rotation of the propeller is below or above a certain predetermined value whereby the pitch of the blades may be varied to any extent at any speed of rotation below the predetermined value and at higher speeds the propeller blades and boss form in effect a rigid structure to maintain the pitch of the blades at the set value.

When the speed is below such a predetermined value which in practice would be just above the usual slow running speed of the engine the centrifugal force on each blade is taken by a mechanical anti-friction thrust bearing such as for instance a ball thrust bearing. The said thrust bearing is spring loaded and is free to move in the direction of the centrifugal force against the force of the spring by a very small amount for example about one half to one thousandth of an inch. The force exerted by the spring is practically constant for such a small movement and is designed to be equal to the centrifugal force acting on the blade at the aforesaid slow running speed. When however this speed is exceeded the force of the spring is overcome by the centrifugal force and a radial movement of the thrust bearing outwards takes place. This movement is limited to about one-half to about one thousandth of an inch by means of any suitable metallic shoulder or other stop but preferably the stop hereinafter referred to which may be regarded as a plain thrust bearing, being designed to transmit the centrifugal load on the blade direct by metallic contact to the propeller boss in such manner that no load exceeding that exerted by the spring is ever taken by the first mentioned thrust bearing.

In order that my invention may be readily understood and carried into effect I will proceed aided by the accompanying drawing more fully to describe the same.

The drawing represents a longitudinal half-section of the boss of a variable pitch propeller having the present invention applied thereto.

Referring to the said drawing, which illustrates one example of the manner in which the present invention may be carried into effect, the numeral 1 represents the propeller shaft, and the numeral 2 represents the propeller boss, and the numeral 3 represents the propeller blade or a socket therefor.

Between the boss 2 and the blade socket 3 is a recess within which is slidably mounted a thrust bearing 4 such as the ball thrust bearing illustrated or an anti-friction thrust bearing of any other suitable type. Said thrust bearing is loaded by means of a spring 5 which at one end bears against the bearing 4 and at the other end bears against a block 6 screwed onto the boss 2. In the particular construction shown a type of ball bearing is employed which is capable of taking radial as well as axial loads. 7 is a stop or annular distance piece located between the bearing 4 and the block 6.

The force exerted by the spring 5 is practically constant for the small movement necessary and is designed to equal the centrifugal force acting on the propeller blade at the aforesaid slow running speed. At times when this speed is not exceeded the propeller blade socket 3 is free to be moved in conjunction with the outer annulus of the thrust bearing 4 around the radial axis of the blade in any appropriate manner (not shown) and the pilot can therefore set the blade to any desired pitch. When however this speed is exceeded the force of the spring 5 is overcome by the centrifugal force and a radial movement of the thrust bearing 4 takes place. This movement is limited to say about one-half to one-thousandth of an inch by means of the aforesaid stop 7 so that when the propeller is rotating above the aforesaid speed the propeller socket 3, the thrust bearing 4, the stop 7 and the block 6 are all forced tightly together by the centrifugal force and in consequence the centrifugal load on the blade 3 is transmitted direct by the plain bearing to the propeller boss 2 in such manner that no load exceeding that exerted by the spring 5 is ever taken by the thrust bearing 4.

From the foregoing description it will be understood that this form of construction allows the pitch of the propeller blades to be varied only when the speed of revolution of the propeller does not exceed the aforesaid slow running speed and that at higher speeds the propeller blade and the propeller hub are in effect a single rigid structure.

It will be understood that appropriate operating gear of any suitable type is employed for changing the pitch of the propeller but as it forms no part of the present invention the same is not described or illustrated.

What I claim and desire to secure by Letters Patent of the United States is:—

1. A propeller of the type set forth comprising a boss, a blade, and thrust bearings of different types for taking the centrifugal load upon the blade in two different manners depending upon whether the speed of rotation of the propeller is below or above a certain predetermined value, whereby the pitch of the blades may be varied to any extent at any speed of rotation of the propeller below the predetermined value and at all speeds above the predetermined one the propeller blade and boss form in effect a rigid structure to maintain the pitch of the blades at the set value.

2. A propeller of the type specified comprising means for directly taking the centrifugal thrust upon the blades at speeds above a predetermined speed of rotation of said propeller whereby variation of the pitch of the blades is prevented and other means for taking the centrifugal thrust upon the blades at speeds at or below the predetermined one whereby the pitch of the blades may be varied to any extent at any speed below the said predetermined speed.

3. A propeller of the type specified comprising a boss, a plurality of blades capable of bodily rotation around the axis of said boss and thrust bearings of different types for taking the substantially axial centrifugal thrust on each of said blades in two different manners and means responsive to changes in angular velocity of said propeller for determining which of said bearings is to take said thrust.

4. A propeller of the type specified comprising a plain thrust bearing for taking the centrifugal load upon each blade, an antifriction thrust bearing for taking the centrifugal load upon each blade and means operative at and below a predetermined speed of rotation of said propeller for causing said load to be carried by said second mentioned bearing for the purpose specified.

5. A propeller of the type specified comprising different means for taking the centrifugal load upon the blades in two different manners and means responsive to variations in the speed of rotation of said propeller for causing the load to be taken in one manner below a predetermined speed of rotation of said propeller whereby the pitch of the blades may be varied to any desired extent at any speed below the predetermined one and in the other manner above said predetermined speed of rotation whereby variation of the pitch of the blades is prevented.

6. In an aircraft propeller of the type specified means for directly taking the centrifugal thrust on the blades above a predetermined angular velocity thereof and means including a spring for indirectly taking said thrust below said speed, said second mentioned means being such that the pitch of the blades may be varied as desired at any speed below said predetermined one.

7. An aircraft propeller of the type specified comprising a boss, a blade, a stationary abutment, a movable thrust bearing permitting angular movement of the blade about its longitudinal axis and means for bringing said movable thrust bearing into operation below a predetermined speed of rotation of the propeller whereby the pitch of the blades may be varied to any extent at any speed below said predetermined speed.

8. An aircraft propeller of the type specified comprising a boss, a blade rotatable bodily about the axis of said boss, a normally stationary thrust abutment, a movable thrust bearing permitting angular movement of the blade about its longitudinal axis, means including a spring for predetermining the thrust to be taken by said movable bearing, and means operable as an incident to the revolution of the propeller blade above a critical angular speed to remove thrusts on the movable bearing in excess of the selected amount.

9. An aircraft propeller of the type specified comprising a boss, a blade movable relatively to said boss and different means for transmitting the centrifugal thrust on said blade to said boss in two different manners depending upon whether the speed of rotation of the propeller is above or below a certain predetermined value whereby the pitch of said blade may be set to and maintained at any desired value.

10. An aircraft propeller of the type specified comprising a boss, a blade, an abutment on said boss, an antifriction thrust bearing between said blade or blade socket and boss and means for predetermining the centrifugal thrust to be taken by said bearing.

11. An aircraft propeller of the type specified comprising a boss, a blade, an abutment on said boss, a slidable antifriction thrust bearing for said blade, and means responsive to changes in the angular velocity of said propeller for determining whether the centrifugal load upon the blade shall be transmitted to said boss directly by said abutment or by said antifriction bearing.

12. An aircraft propeller of the type specified comprising a boss, a blade, an abutment carried by said boss, an antifriction bearing between the blade or blade socket and said boss and capable of a limited sliding movement with respect thereto and a spring between said abutment and bearing permitting the centrifugal load to be carried directly by said abutment above a predetermined speed of rotation of said propeller and by said antifriction bearing below said speed.

13. In a propeller of the type specified means for taking the centrifugal load on the blades comprising a slidable spring loaded antifriction thrust bearing for taking the centrifugal load when the speed of rotation of the propeller is below a predetermined value and a shoulder or stop for communicating said load direct to the boss of the propeller when said speed exceeds such value.

14. In a propeller of the type specified mechanical means for taking the centrifugal load on each blade comprising a slidable antifriction thrust bearing, a spring for holding said bearing in a desired position at and below a predetermined speed of rotation of said propeller, and means for limiting the outward movement of said bearing against the action of said spring at speeds above said predetermined speed.

In witness whereof I, MOGENS LOUIS BRAMSON have signed this specification.

MOGENS LOUIS BRAMSON.